(12) United States Patent
Gaurav

(10) Patent No.: US 12,670,085 B1
(45) Date of Patent: Jun. 30, 2026

(54) DETERMINISTIC OFFLINE CODE REMEDIATION WITH LEDGER-VERIFIED REPLAY AND TEMPLATE-BASED PATCH GENERATION

(71) Applicant: Apurv Gaurav, Camden, NJ (US)

(72) Inventor: Apurv Gaurav, Camden, NJ (US)

( * ) Notice: Subject to any disclaimer, the term of this patent is extended or adjusted under 35 U.S.C. 154(b) by 0 days.

(21) Appl. No.: 19/545,244

(22) Filed: Feb. 20, 2026

(51) Int. Cl.
*G06F 11/3604* (2025.01)
*G06F 8/65* (2018.01)

(52) U.S. Cl.
CPC ............ *G06F 11/3608* (2013.01); *G06F 8/65* (2013.01)

(58) Field of Classification Search
CPC ................................... G06F 8/65; G06F 11/36
See application file for complete search history.

(56) References Cited

U.S. PATENT DOCUMENTS

| | | | |
|---|---|---|---|
| 11,392,696 B1 * | 7/2022 | Umland | G06F 8/51 |
| 2022/0171699 A1 * | 6/2022 | Velammal | G06F 11/3692 |
| 2024/0168755 A1 * | 5/2024 | Noppen | G06N 20/20 |

* cited by examiner

*Primary Examiner* — Ziaul A Chowdhury
(74) *Attorney, Agent, or Firm* — Arman Khosraviani

(57) ABSTRACT

Systems, methods, and other embodiments associated with enforcing deterministic code remediation. In one embodiment, a method includes deterministic replay remediation of a computer processable received code having visual or textual information or building block. The method further includes executing at least one run, each executed run including: selecting a remediation template based on at least a portion of the received code, the remediation template having at least one of code remediation data and remediation instructions. The method includes applying the one or more code remediation data or remediation instructions to the received code, and storing the received code applied with the one or more code remediation data or remediation instructions from the remediation template as a processed code. Then the method continues by executing a second run and comparing the processed code from the first and second runs to verify whether they match at a byte level.

20 Claims, 5 Drawing Sheets

300

305
Receiving computer processable code comprising visual or textual information or building block 310
Selecting, upon execution of at least one run, a remediation template based on at least a portion of the received code, the remediation template comprising at least one of code remediation data and remediation instructions 315
Applying, in the executed run, the one or more code remediation data or remediation instructions to the received code 320
Storing, after the executed run, the received code applied with the one or more code remediation data or remediation instructions from the remediation template as a processed code 325
Executing a second run to obtain processed code from the second run 330
Comparing the processed code from an executed first run with the processed code from the executed second run 335
Verifying whether the processed code from the first run matches the processed code from the second run at a byte level

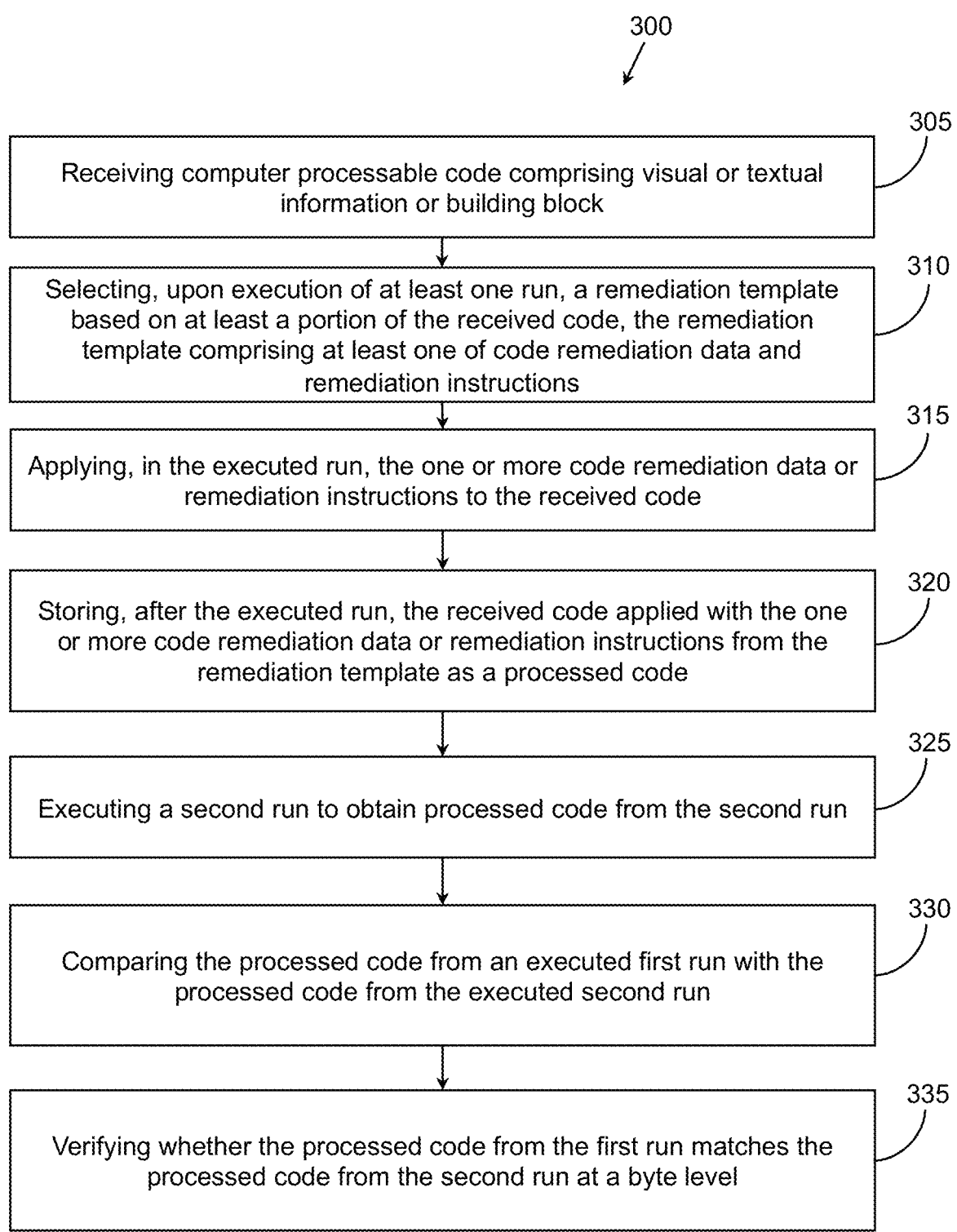

300

305

Receiving computer processable code comprising visual or textual information or building block

310

Selecting, upon execution of at least one run, a remediation template based on at least a portion of the received code, the remediation template comprising at least one of code remediation data and remediation instructions

315

Applying, in the executed run, the one or more code remediation data or remediation instructions to the received code

320

Storing, after the executed run, the received code applied with the one or more code remediation data or remediation instructions from the remediation template as a processed code

325

Executing a second run to obtain processed code from the second run

330

Comparing the processed code from an executed first run with the processed code from the executed second run

335

Verifying whether the processed code from the first run matches the processed code from the second run at a byte level

FIG. 3

DETERMINISTIC OFFLINE CODE REMEDIATION WITH LEDGER-VERIFIED REPLAY AND TEMPLATE-BASED PATCH GENERATION

TECHNICAL FIELD

The embodiments generally relate to methods and systems for software or code remediation, and more particularly, relates to methods and systems for deterministic offline code remediation with ledger-verified replay and template-based patch generation. The present disclosure may be applied to correct code vulnerabilities, implement code optimizations, merge, translate, or modify code between different systems or operating environments, and correct bugs or patch software.

BACKGROUND

Traditional approaches to code patching use static analysis tools such as CodeQL™ and Semgrep™ that can point out a flaw in code, but they stop short of producing a correction that behaves the same way every time it is applied. More recent software or code repair systems are built around large language models (LLMs), including Copilot™ and Snyk Code™, that generate patches through probabilistic inference. However, the patches generated through LLMs can often differ from one execution to the next. That variability creates audit gaps, makes compliance review difficult, and prevents a reviewer from proving that a fix will perform identically in the future. Further, most existing approaches also depend on network connectivity or external inference services, meaning they cannot be isolated or run offline for code remediation. Systems that track remediation activity often do so only as an after-the-fact record rather than as a precondition for allowing a change to move forward. Moreover, these systems can lack the ability to associate a patch with the code state it modified. Organizations that operate in regulated environments need remediation workflows that can be replayed, verified, and trusted years after the change was made. A fix that cannot be reproduced exactly cannot be certified with confidence. Therefore, there is a need for a system that can deliver reproducible, auditable, compliance-safe remediation without relying on heuristics, cloud inference, or non-deterministic patching.

BRIEF DESCRIPTION OF THE DRAWINGS

The accompanying drawings, which are incorporated in and constitute a part of the specification, illustrate various systems, apparatus, methods, and one or more implementations of the disclosure. It will be appreciated that the illustrated element boundaries (e.g., boxes, groups of boxes, or other shapes) in the figures represent one implementation of the boundaries. In some implementations one element may be implemented as multiple elements or that multiple elements may be implemented as one element. In some implementations, an element shown as an internal component of another element may be implemented as an external component and vice versa. Furthermore, elements may not be drawn to scale. The drawing figures depict one or more implementations in accordance with the present teachings, by way of example only, not by way of limitation. It is to be understood that the drawings are designed for the purpose of illustration only and not as a definition of the limits of the present disclosure. In the figures, like reference numerals refer to the same or similar elements. Furthermore, it should be understood that the drawings are not necessarily to scale. A complete understanding of the present implementations and the advantages and features thereof will be more readily understood by reference to the following detailed description when considered in conjunction with the accompanying drawings wherein:

FIG. 3 illustrates one embodiment of a method performed by the system of FIG. 1 for enforcing deterministic replay remediation and verification, in accordance with aspects of the present disclosure.

SUMMARY

Figure 1:
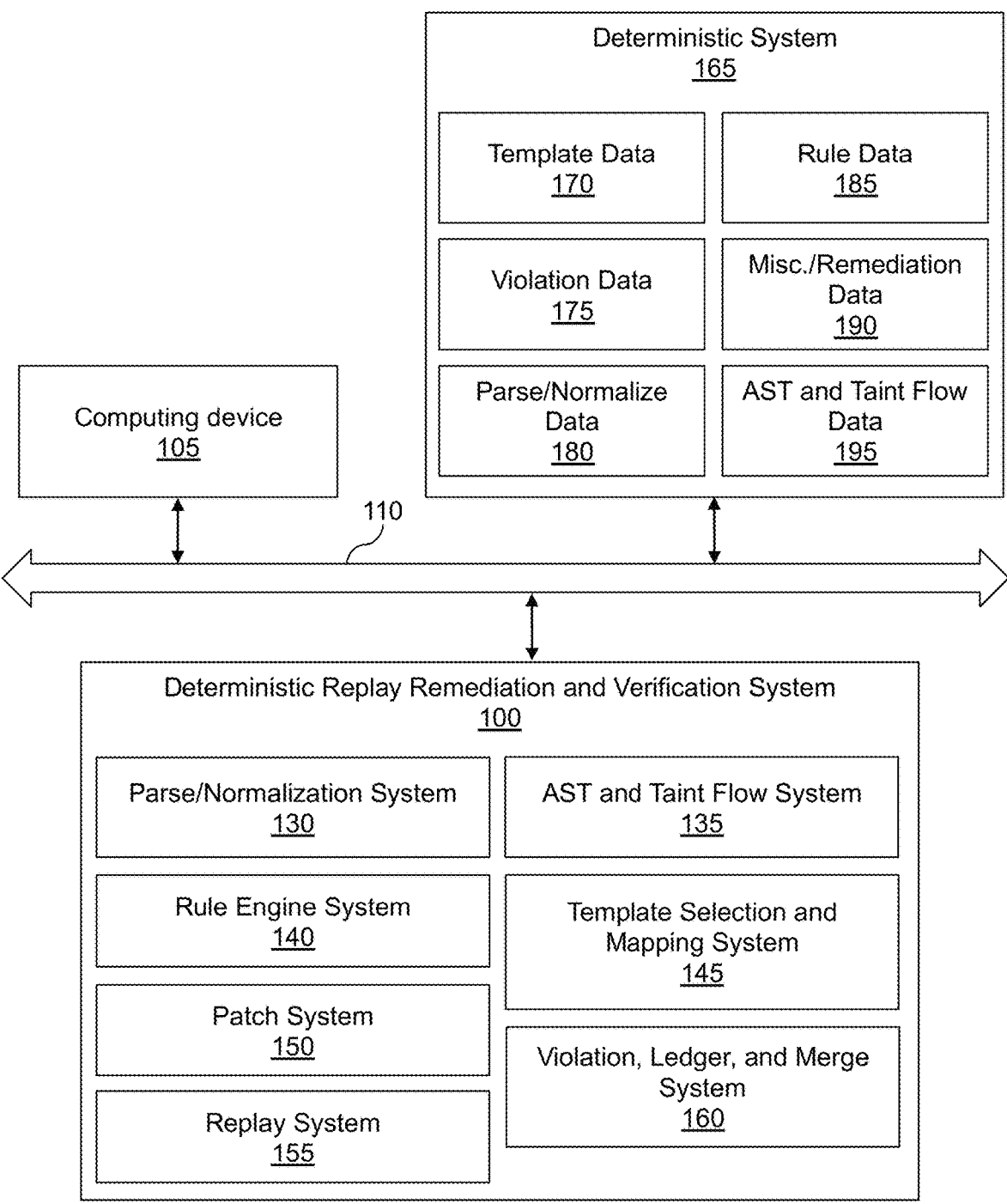
FIG. 1 illustrates one embodiment of a computing system configured to enforce deterministic replay remediation and verification using static, predefined, non-generative templates to provide reproducible fixes, auditable changes, long-term traceability, and preventing uncertain or unverifiable changes and accidental or unstable merges, in accordance with aspects of the present disclosure.

In an implementation, a method for deterministic replay remediation and verification of code, comprising: receiving computer processable code comprising visual or textual information or building block; executing at least one run, each executed run comprising: selecting a remediation template based on at least a portion of the received code, the remediation template comprising at least one of code remediation data and remediation instructions, applying the one or more code remediation data or remediation instructions to the received code, and storing the received code applied with the one or more code remediation data or remediation instructions from the remediation template as a processed code; executing a second run of the at least one run; comparing the processed code from an executed first run with the processed code from the executed second run; and verifying whether the processed code from the first run matches the processed code from the second run at a byte level In an implementation, a non-transitory computer-readable medium that includes stored thereon computer-executable instructions that when executed by at least a processor of a computer cause the computer to: receive computer processable code comprising visual or textual information or building block; execute at least one run, each executed run comprising: selecting a remediation template based on at least a portion of the received code, the remediation template comprising at least one of code remediation data and remediation instructions, applying the one or more code remediation data or remediation instructions to the received code, and storing the received code applied with the one or more code remediation data or remediation instructions from the remediation template as a processed code; execute a second run of the at least one run; compare the processed code from the first run with the processed code from the second run; and verify whether the processed code from the first run matches the processed code from the second run at a byte level.

In an implementation, a computing system comprising: a processor; and memory in communication with the processor and storing instructions that, when executed by the processor, cause the computing system to: receive computer processable code comprising visual or textual information or building block; execute at least one run, each executed run comprising: selecting a remediation template based on at least a portion of the received code, the remediation template comprising at least one of code remediation data and remediation instructions, applying the one or more code remediation data or remediation instructions to the received code, and storing the received code applied with the one or more code remediation data or remediation instructions from the remediation template as a processed code; execute a second run of the at least one run; compare the processed code from the first run with the processed code from the second run; and verify whether the processed code from the first run matches the processed code from the second run at a byte level.

DETAILED DESCRIPTION

Systems and methods described herein are associated with deterministic replay remediation and verification in which a code patch is accepted only when a second or subsequent execution of remediation (code patch/fix) produces an identical code patch with the same rules and template conditions. When desired, the result may be recorded in an append-only ledger with optional tenant isolation, allowing each codebase to maintain its own traceable history without interference across systems. The core distinction from conventional methods is that authority to merge or commit exists only after replay-exact equivalence is proven. The present disclosure diverges from static analyzers, AI-driven patch generators, and blockchain-style audit systems by making reproducibility a gate rather than an observation. A fix is not merely proposed or logged—it is only accepted when a second execution produces the same result at a byte level. Conventional tools may detect an issue, suggest a repair, or archive an event for later review, but they do not make determinism a precondition for code modification. Here, replay identity is the deciding factor. Moreover, the system can run offline (or be restricted to offline execution), apply predefined templates, and reject any change that cannot be reproduced exactly.

Tools such as CodeQL™, Semgrep™, and SonarQube™ evaluate code and surface potential vulnerabilities, yet they provide no assurance that their evaluation or their output would remain stable if executed again under the same conditions. Rule sets evolve, environments differ, and small context shifts alter results. In the present disclosure, a remediation has no authority unless it regenerates identically on replay, and a mismatch triggers a rollback automatically. LLM-based repair tools may yield different patches for the same input depending on model state, sampling randomness, inference temperature, or later model updates. This makes replay-validation impossible and undermines compliance review. The present disclosure avoids inference entirely as a fix is constructed from static templates with ordered substitution and version-pinned rules, producing stable output regardless of when or where the run occurs.

Many tools rely on cloud connectivity to retrieve rules, submit inference queries, or run training-dependent logic. Results may shift when a network call fails or when a service is updated remotely. The present system and method can operate inside a denied-network boundary, meaning no DNS, HTTP, TLS, or inference endpoints are reachable.

Existing ledger or blockchain systems record what has already happened but do not dictate whether a remediation may occur. The method and system described herein, the ledger is part of the control path, that is, only when replay identity is verified does the system commit a change. If outputs differ upon replay of code remediation, a rollback is automatically triggered, and no ledger entry is written. The ledger is therefore regulatory, not archival.

To the inventor's knowledge, no prior system or method integrates deterministic remediation without inference, mandatory replay identity before commit, rollback as an automatic failure mode, a ledger that enforces rather than observes, complete offline execution with no external drift, template-stable output across time and machines, and sharded audit domains for multi-tenant isolation. The system and method can ensure reproducible remediation under replay-gated control, addressing compliance and audit requirements that prior art does not meet. Further, the present disclosure introduces an offline remediation engine designed to generate software fixes that can be reproduced exactly. Unlike probabilistic or model-driven repair tools, the method and system of the present disclosure rely on deterministic rule execution and static, predefined templates. Given the same source input, the same output is produced every time—whether the run occurs minutes later or years later. The system may be implemented as four cooperating components: (1) a static analysis core that performs taint tracking and control-flow evaluation; (2) a template execution engine that applies non-generative remediation patches; (3) a replay validator that re-executes the same process to confirm bit-for-bit equivalence; and (4) a hash-linked ledger that records lineage only when replay succeeds. This architecture can remove nondeterminism and external variability from the code repair path, enabling trusted, reproducible remediation.

System Embodiment

With reference to FIG. 1, one embodiment of a computing environment is illustrated that is configured with a deterministic replay remediation and verification system 100. In one embodiment, the deterministic replay remediation and verification system 100 is configured to autonomously execute with and/or be integrated with a selected software application that includes a deterministic database system 165. In one embodiment, the deterministic replay remediation and verification system 100 is configured to enforce deterministic replay remediation and verification of received code provide by, a user or computing system, for example computing device 105. The deterministic replay remediation and verification system 100 may further retrieve data/instructions associated with remediation and verification from deterministic system 165. In some implementations, the deterministic system 165 may be integrated with the deterministic replay remediation and verification system 100. In some implementations, the deterministic system 165 and the deterministic replay remediation and verification system 100 may be implemented within an intranet, company network, local network, or the like. The deterministic replay remediation and verification system 100 together with the deterministic system 165 may prepare and evaluate received code for processing by static, predefined, non-generative templates. The static, predefined, non-generative templates are implemented to patch/process the received code. During each execution of code patching/processing, the deterministic replay remediation and verification system 100 computes a hash of the patched code and performs bit-for-bit comparison of the patch hash for the first and second execution to cryptographically verify remediation. The deterministic replay remediation and verification system 100 provides reproducible code fixes, auditable changes, long-term traceability, and prevents uncertain or unverifiable changes and accidental or unstable merges.

In one implementation, the deterministic system 165 may include, but is not limited to, a computer application/program that includes one or more algorithms configured to generate one or more results based on one or more input values. The algorithm may comprise a set of functions that generate an output based on the contents of received code, remediation template data and instructions, attributes/variables of the received code (e.g., hash, version, ledger entries, etc.), rule logic and rule evaluation based on code logic/content, and patching logic. In one implementation, the deterministic system 165 may include template data 170, violation data 175, perse/normalize data 180, rule data 185, miscellaneous/remediation data 190, and abstract syntax tree (AST) and taint propagation flow data 195. Further, in some embodiments, the deterministic system 165 may be configured as a database to provide data and/or instructions to the deterministic replay remediation and verification system 100. In certain implementations, the deterministic system 165 may include one or more processors and memory/storage to compare and evaluate received code to determine, for example, template mapping and selection, violation parameters, hash/ledger information, and so forth.

In one implementation, the deterministic system 165 may include template data 170 comprising one or more remediation templates with code remediation data and remediation instructions that align or map with one or more functions, algorithms, or data processed, sent, or received by the received code. One or more remediation templates may be provided in each run of the deterministic replay remediation and verification system 100. The template data 170 may provide one or more static, rule based, non-generative, and predefined remediation templates having data and instructions associated with at least one of code analysis and rule evaluation. The template data 170 may include data for class mapping, version information, signature information to remain authenticated/unchanged during each run of the deterministic replay remediation and verification system 100 to assure future compliance.

Further, in certain implementations, the deterministic system 165 may include violation data 175 comprising instructions and data for logging and processing a violation associated with unavailability of remediation template(s) based on the received and parsed/evaluated code. The deterministic system 165 may include parse/normalization data 180 for preparing the received code for AST construction, taint propagation, and rule evaluation as is known in the art. The deterministic system 165 may further include rule data 185 for evaluating and determining common weakness enumeration. Rule data 185 may include data and instructions for syntax analysis, abstract syntax tree generation, taint propagation, compliance scoring, and template assignment.

In one implementation, the deterministic system 165 may include miscellaneous/remediation data 190 for creating a cryptographic hash associated with each execution of received code (processed/patched code) and recording an entry on a ledger. The ledger entry may include at least one of a rule hash, a template hash, a generated patch hash, and a replay verification signature associated with the processed code in each of a first and second run. In some implementations, the miscellaneous/remediation data 190 may store remediation templates and/or rule data offline to enable one or more code remediation data or remediation instructions to be retrieved and applied offline. As an example, the miscellaneous/remediation data 190 may be integrated with the deterministic replay remediation and verification system 100 whereby both systems may perform code remediation and verification processes offline. Further, in certain implementations, the miscellaneous/remediation data 190 may store a previous known-good state of an executed run (e.g., processed code), violation notifications and information pertaining to unavailability/non-matching remediation templates from an executed run.

In one implementation, the deterministic system 165 may include AST and taint propagation flow data 195 for performing abstract tree syntax and taint propagation flow. In one or more embodiments, AST and taint propagation flow data 195 may include structural program data and predefined propagation rules that govern how untrusted input flows through the received code, software, or program. This may include parsed representation of the code, typically an abstract syntax tree (AST), so that assignments, function calls, parameters, return values, and control-flow constructs can be traversed deterministically. A defined set of taint sources, such as user input variables, request parameters, file reads, or external data interfaces, identified through rule metadata. In addition, a catalog of sensitive sinks, including database execution calls, filesystem writes, command invocations, or network transmissions. The AST and taint propagation flow data 195 may include taint propagation rules that specify how taint transfers across variable assignments, function arguments, return values, object properties, and interprocedural calls. The AST and taint propagation flow data 195 may include control-flow analysis instructions so that taint can be tracked through branches, loops, and conditional paths without ambiguity. The AST and taint propagation flow data 195 may include structured metadata such as node identifiers, depth indices, and source-to-sink trace vectors to ensure reproducibility and auditability. The AST and taint propagation flow data 195 may include information for deterministic traversal order so that the instructions define fixed evaluation sequencing to avoid nondeterministic path resolution. Finally, the AST and taint propagation flow data 195 may include configuration constraints that prevent inference, randomness, or environment-dependent variability so that identical input produces identical taint graphs across repeated runs.

In some implementations, the AST and taint propagation flow data 195 may include fully tokenized and normalized representation of the received code along with a formal grammar definition for the programming language being processed. The grammar may provide production rules that describe how tokens combine into syntactic constructs such as expressions, declarations, statements, and control structures. A parser, typically deterministic and grammar-driven, may use these rules to convert the linear token stream into a hierarchical tree structure. The AST construction process must assign node types, parent-child relationships, and positional metadata (such as line numbers and character offsets) for each syntactic element. The AST and taint propagation flow data 195 may include canonical ordering instructions to ensure that child nodes, attributes, and symbol table entries are inserted in a stable and reproducible order. The AST and taint propagation flow data 195 may include symbol resolution data, including variable declarations, scope boundaries, and function signatures that may be needed to correctly represent identifiers within the tree. The AST and taint propagation flow data 195 may include error-handling instructions necessary to manage malformed input without introducing nondeterministic recovery behavior. The AST and taint propagation flow data 195 may include version-pinned parsing rules and environment-independent execution constraints so that AST construction produces identical structural output across different machines and execution times. The implementation embodiments are not intended to be limiting.

As shown in FIG. 1, the computing environment may provide access to remote client devices such as client computing device 105 through one or more network communication channels 110 (e.g., a communication bus, wireless communication, wired networks, combinations of channels, etc.). A client device may access and communicate with the deterministic replay remediation and verification system 100 via a graphical user interface to provide code, data, and/or instructions to the deterministic system 165. The deterministic replay remediation and verification system 100 may be configured to include a parse/normalization system 130 to parse and normalize a received code, an AST and taint propagation flow system 135 to perform abstract syntax tree construction and taint propagation flow evaluation, and a rule engine system 140 to perform rule evaluation to determine one or more remediation templates to apply to the received code. The deterministic replay remediation and verification system 100 may be further configured to include a template selection and mapping system 145 to select and map one or more remediation templates based on the content of the received code and a patch system 155 to perform one or more code patches/fixes based on the remediation data and remediation instructions provided by the one or more remediation templates obtained by the deterministic replay remediation and verification system 100. The deterministic replay remediation and verification system 100 may be further configured to include a replay system 155 to re-execute the process of processing the received code as described herein in FIGS. 2A-2B to determine one or more remediation templates to be applied to the received code. Further, the deterministic replay remediation and verification system 100 may be configured to include a violation, ledger, and merge system 160 to determine whether a code can be safely applied with a remediation template. In the case of unavailable/non-matching remediation template the violation, ledger, and merge system 160 logs a violation only outcome and allows further processing of the received code (i.e., allows CI/CD Merge if one or more templates/code fixes can be applied). When the deterministic replay remediation and verification system 100 determines that no templates can be applied, or that a pair of executions results in non-matching patches (i.e., a first run patch and a second run patch are not bit-for-bit identical and their hashes do not match exactly) a violation log is recorded and the last known good state of the received code is committed/stored.

In a further aspect of the disclosure, FIG. 1 depicts an example computing environment/system in which code/source files are ingested, normalized to a common representation, and parsed into an abstract syntax tree (AST), after which taint information is propagated through function calls, assignments, and branching logic until a violation is identified when untrusted data reaches a sensitive sink such as a database write, filesystem operation, shell invocation, or network transmission. Each rule maps to a deterministic template, and when a violation is detected, the execution core selects the appropriate template, substitutes parameters in a predefined order, and generates a patch while computing a replay hash so that the same operation can be performed a second time under identical conditions. The remediation process follows a fixed sequence consisting of ingestion and normalization of source input, AST construction, rule evaluation in deterministic order, template-driven patch generation, and replay validation with optional ledger commit. No external models or stochastic sampling influence execution, and if the same code is processed later, the pipeline produces the same patch, independent of machine, runtime load, or environmental conditions.

Run-Time or Operational Method

Figure 2A:
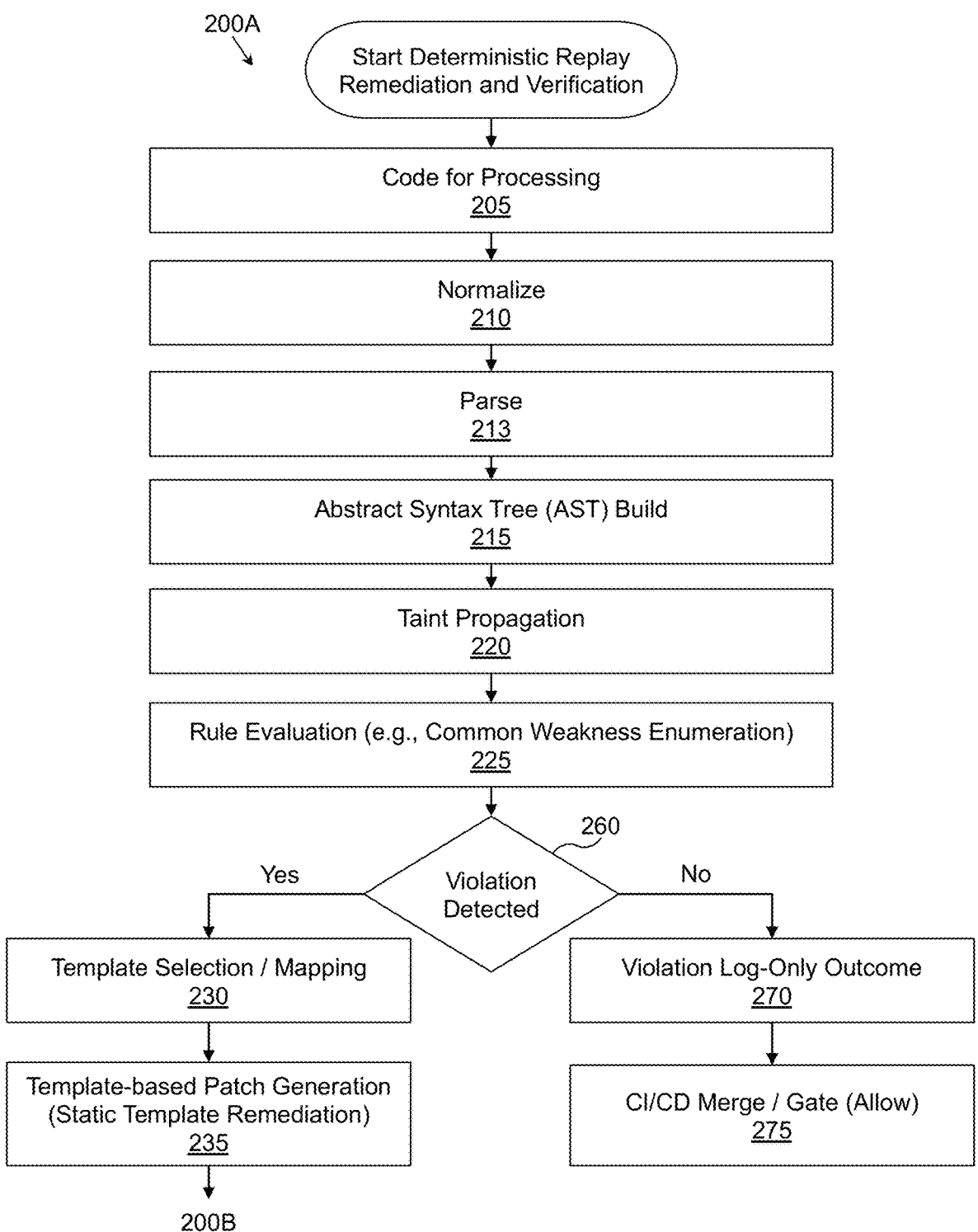
FIG. 2A illustrates one embodiment of an overview of a run-time or operational method associated with the deterministic replay remediation and verification system of FIG. 1 triggered by a request to obtain code for processing.
Figure 2B:
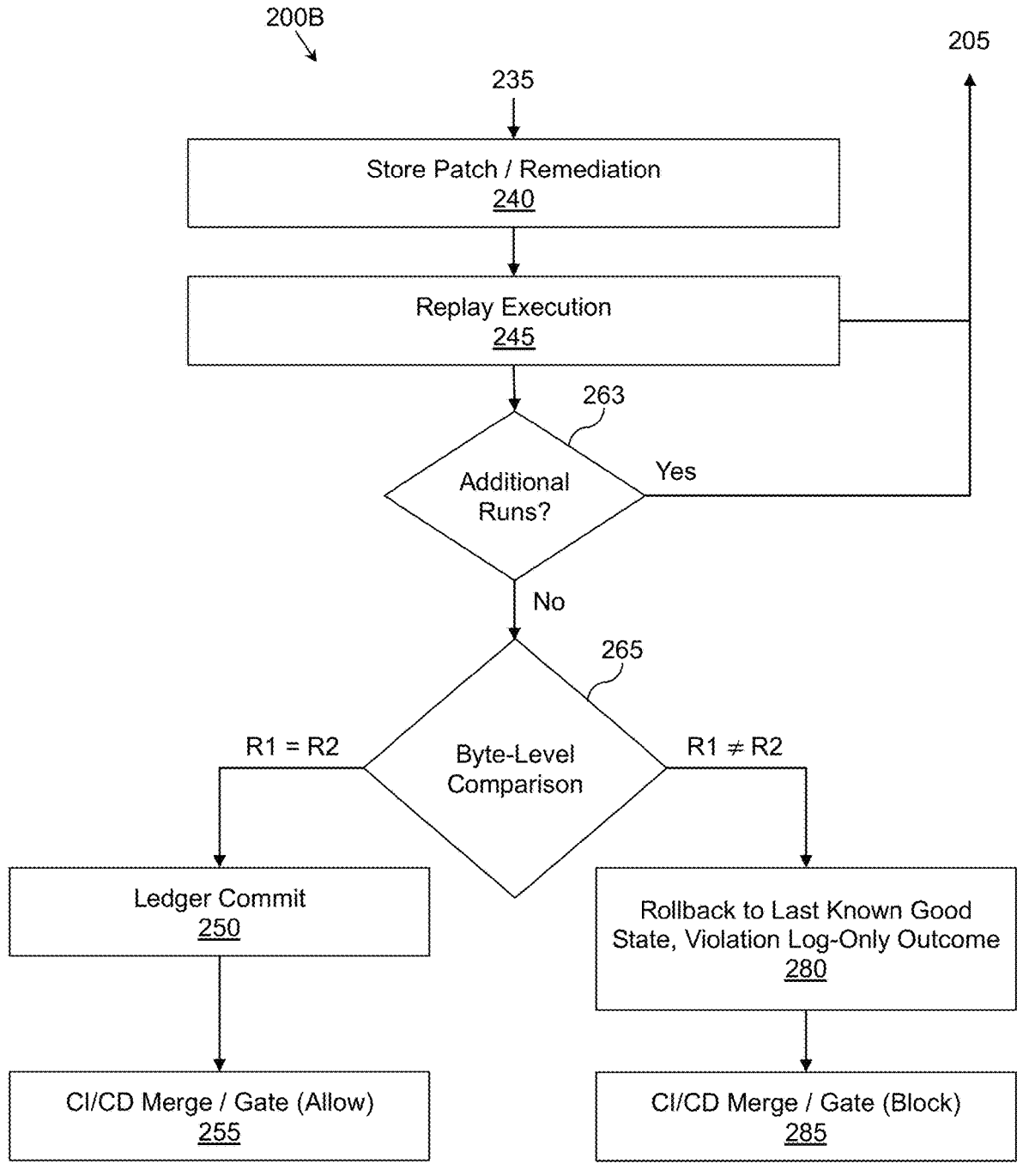
FIG. 2B illustrates one embodiment of sub-steps associated with FIG. 2A.

With reference to FIG. 2A, one embodiment of a method 200A is illustrated that shows a run-time or operational method performed by the deterministic replay remediation and verification system 100 of FIG. 1 for enforcing deterministic replay remediation and verification of received code. Method 200A includes one embodiment of block 305 of FIG. 3 for receiving code to be processed, block 310 for selecting a template based on the received code, and block 315 for applying the template (data and instructions) to the received code (processing the code). Although blocks 305, 310, and 315 refer to the first execution run, those blocks and method 200A may apply for deterministic remediation and verification in the first execution run and/or other execution runs. In other words, multiple runs 2 or more, 3 or more, etc., may be implemented to ensure patched/processed code is stable, verified, and optimized (size, memory, etc.). FIG. 2B illustrates one embodiment of sub-steps associated with method 200A as described below. Upon a second or additional executed run, the processed and verified code may then be tagged, recorded, visually displayed and merged when every iteration of method 200A (each iteration of processed code) matches byte-for-byte when compared with one another. When processed code in each iteration/executed run matches byte-for-byte, a merge operation is allowed, the deterministic replay remediation and verification system 100 patches, fixes, or revises the received code, block, or software. When the processed code does not match byte-for-byte from another executed run, the processed code is rolled back to the last known good state. In some embodiments, the last known good state may be the original received code.

Figure 4:
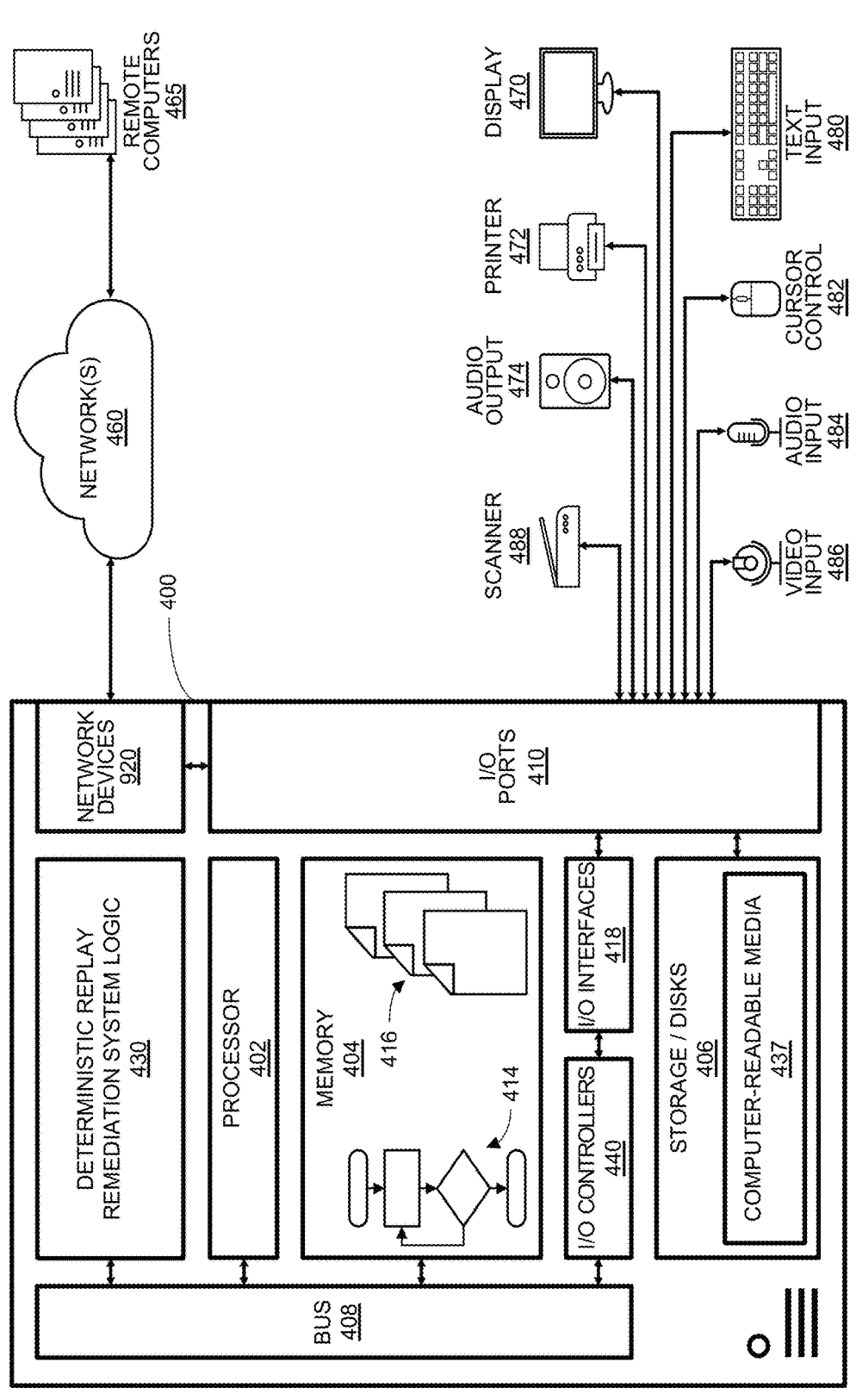
FIG. 4 illustrates an embodiment of a computing system configured with the example systems and/or methods disclosed.

Blocks shown in FIGS. 2A-2B may represent one or more processes, methods or subroutines, carried out in the exemplary method. FIG. 1 and FIGS. 3-4 show example embodiments of carrying out the method of FIGS. 2A-2B for enforcing deterministic replay remediation and verification using static, predefined, non-generative templates to provide reproducible fixes, auditable changes, long-term traceability, and preventing uncertain or unverifiable changes and accidental or unstable merges. Method 200A may be used independently or in combination with other methods or processes for creating a deterministic replay remediation and verification system for enforcing byte-to-byte level matching code patches/fixes, ensuring reproducible fixes, auditable changes, long-term traceability, and preventing uncertain or unverifiable changes and accidental or unstable merges. For explanatory purposes, the example method 200A is described herein with reference to FIG. 1 and FIGS. 3-4.

In one embodiment, method 200A may be implemented and performed by the deterministic replay remediation and verification system 100 of FIG. 1. With the deterministic replay remediation and verification system 100, byte-identical replay before commit is required and rollback as a cryptographic rule is enforced. In many implementations, code for remediation may be prepared for evaluation, patched based on static, non-generative remediation templates, committed/patched when byte-identical, and entered into a ledger. This ensures reproducible, auditable, and compliance-safe remediation. That is, only replay-verified, byte-identical patches can be promoted to protected branches or production. In operation, user (or service/software) may access the deterministic replay remediation and verification system 100 (or a remediation system that is configured with the deterministic replay remediation and verification system 100), enter code (or request access to code) and execute the deterministic replay remediation and verification system. Execution may be performed multiple times for the same code. The templates and output (processed/patched code) may be configured for a particular operating environment/system or computing system. Method 200A may identify the code behavior, language, inputs, outputs, attributes, data types and values, dependencies, and so forth, that may be necessary for determining one or more proper remediation templates in each executed run.

Method 200A is discussed from a perspective where the deterministic replay remediation and verification system has been executed (first execution run) with at least one code as an input for processing. The deterministic replay remediation and verification system may begin at subsequent blocks in method 200A based on the content and condition of code received. For example, when code has been previously patched and committed with a corresponding ledger entry by the deterministic replay remediation and verification system, subsequent executions of deterministic replay remediation and verification system may bypass one or more blocks associated with parsing, normalization, syntax evaluation, taint propagation, and so forth. Moreover, committed code may be assigned or associated with one or more remediation templates using stored data (metadata) from an executed run of the deterministic replay remediation and verification system.

Method 200A begins at block 205, for example, when a user (software/service) requests code for processing in the deterministic replay remediation and verification system and re-executes (second execution run). In one or more embodiments, code access/retrieval for remediation may be facilitated by a script, program, schedule, organization policy, or otherwise by another remote or local computing device. In another embodiment, the subsequent execution (code remediation) may access a stored copy of the retrieved code. In many implementations, code may be analyzed through a fixed sequence that includes syntax processing, abstract syntax tree construction, taint tracing, and rule-based evaluation. Corrections can be produced with predefined templates rather than generative inference, so a patch created today will match one created later under the same conditions. Normalization and template selection are version-controlled to avoid drift and preserve consistency across builds and hardware.

In one or more embodiments, the deterministic replay remediation and verification system 100 may be configured to create a series of JSON records that capture each stage of execution, including violation identification, patch application, replay verification, and ledger settlement. Field locations, ordering, and hashing rules are fixed so that a second execution on identical source input yields the same JSON output byte-for-byte. This can enable long-term forensic verification, even if reproduced years later and on different hardware.

With reference to FIG. 2A, at block 210, the deterministic replay remediation and verification system 100 may normalize the received code to a common representation. Code normalization can by a pre-processing step that precedes parsing and guarantees canonical input consistency. During normalization, code may be transformed into a common representation in which whitespace folding, token stabilization, and canonical formatting rules are applied. This step ensures that semantically identical but textually different files produce identical internal representations. A normalization engine can remove superficial variability that could otherwise lead to divergent ASTs or inconsistent rule evaluations. Further, the deterministic replay remediation and verification system 100 may lock in version identifiers for rulesets and template bundles so that subsequent analysis remains replay stable. In one aspect of the disclosure, normalization may be configured to be deterministic, meaning identical inputs yield identical canonical outputs regardless of machine or runtime state. Further, normalization can facilitate canonical lexing (converting code (e.g., data streams) into a standardized, unique, or "canonical" form of tokens to ensure that different, but functionally equivalent, representations of the same input are reduced to a single, consistent output). Canonical lexing can prevent drift caused by encoding differences or formatting inconsistencies. This stage also prepares the input code for consistent hashing allowing replay validation and ledger anchoring. By stabilizing the code before deeper structural analysis, normalization ensures that every downstream remediation decision remains reproducible across time and hardware environments.

In many implementations, tokenization may occur during normalization stage, whereby a deterministic preprocessing operation is performed to convert raw code into a canonical token stream suitable for structural analysis. During this phase, whitespace is folded and formatting differences are eliminated so that semantically identical files produce identical token sequences. A tokenizer operation may be performed to prepare the code input for grammar parsing and AST formation. Its output becomes part of a token structure, ensuring that identical source input always yields the same sequence of tokens regardless of environment. The system requires canonical lexing rules so that token boundaries are stable and immune to machine-dependent behavior. A token stream, or a sequential, ordered flow of "tokens" or discrete units of data, text, or code may be generated during parsing or lexical analysis. Token sequences are version-anchored to the applicable ruleset and template versions, which later serve as replay anchors. Because replay identity is mandatory for commit, tokenization must never introduce entropy such as unordered maps or time-based metadata. The tokenizer operation feeds directly into deterministic parsing, ensuring that syntax processing operates over a stable lexical representation. If tokenization were nondeterministic, downstream AST generation and remediation would drift, so the deterministic replay remediation and verification system enforces fixed lexical ordering and reproducible encoding. Tokenization therefore may serve as the foundation of the deterministic pipeline, occurring immediately after source ingestion and before AST build, taint propagation, rule evaluation, and template-based remediation.

With reference again to FIG. 2A, at block 213, the deterministic replay remediation and verification system 100 may parse the received code and normalized code into a structured representation suitable for analysis. Parsing may occur after canonical normalization so that syntactic elements are stabilized before deeper evaluation. The deterministic replay remediation and verification system 100 can convert token streams into a defined grammar structure, ensuring that whitespace and superficial formatting differences do not affect downstream processing. This parsing step produces a syntax-aware representation that can be traversed deterministically without reliance on heuristics or probabilistic inference. Parsing may be executed in a fixed order such that code processing does not branch unpredictably, preserving reproducibility across runs. Further, parsing may be configured for offline execution, meaning no external services influence how the code is interpreted. The parsing stage can feed directly into abstract syntax tree construction, ensuring that structural relationships between functions, variables, and expressions are preserved. Since the same source input must yield the same parsed representation every time, the parser can be designed to eliminate entropy sources such as nondeterministic token ordering or environment-dependent grammar behavior.

With reference again to FIG. 2A, at block 215, the deterministic replay remediation and verification system 100 may build an abstract syntax tree (AST) as a structural transformation enabling deterministic rule evaluation and taint propagation. Once the received code has been normalized and parsed, the deterministic replay remediation and verification system 100 may construct an AST with fixed child ordering and lexicographically sorted attributes. Each node in the abstract syntax tree represents a syntactic construct such as a function call, assignment, or control-flow branch. The AST serves as the backbone for taint tracking, allowing the deterministic replay remediation and verification system 100 to trace untrusted data from source nodes to sink nodes through deterministic traversal logic. Serialization of the AST must produce identical output on every replay, preventing variation due to memory layout or execution timing. Depth indices and structural identifiers are stabilized so that taint vectors remain consistent across runs. The AST directly feeds rule evaluation, where violations are identified based on structural patterns rather than textual heuristics. Since remediation templates rely on precise AST coordinates, any change in tree structure would compromise replay identity, so strict canonical ordering is enforced. The AST therefore functions as the deterministic structural model that underpins reproducible remediation, replay validation, and ledger-anchored commit control within the deterministic replay remediation and verification system 100.

With reference again to FIG. 2A, at block 220, the deterministic replay remediation and verification system 100 may perform taint propagation to identify vulnerabilities in code (e.g., SQL injection) or cross-site scripting by marking inputs, tracing them through operations, and flagging if they reach a sink without sanitization. Taint information can be propagated through function calls, assignments, and branching logic. Further, taint propagation may be traced through code. Untrusted input is followed through call stacks, branches, and assignment paths. When taint reaches a protected sink-SQL execution, shell commands, file writes, or network emission-a rule is triggered. Taint propagation enables deterministic tracing of untrusted input through the abstract syntax tree and across program control paths until it potentially reaches a protected sink. After normalization and AST construction, the deterministic replay remediation and verification system 100 follows data flows originating from external or user-controlled sources such as request parameters or input variables. The propagation logic tracks assignments, function calls, and branching paths without probabilistic inference or heuristic shortcuts. Each taint path is represented structurally, including depth indexing and source-to-sink relationships, ensuring reproducibility across executions. The deterministic replay remediation and verification system evaluates how tainted data traverses variables, parameters, and intermediate operations before interacting with sensitive operations such as database execution, filesystem writes, command invocation, or network transmission. When tainted data reaches a protected sink, the propagation process produces a structured taint vector capturing the source node, sink node, propagation depth, and contextual metadata. This vector becomes the evidentiary basis for downstream enforcement rather than an advisory signal. The taint propagation process is entirely deterministic. Identical source input and rule versions produce identical taint graphs. Further, replay integrity is preserved as there is no runtime entropy, external lookup, or model-based scoring to influence taint resolution.

With reference again to FIG. 2A, at block 225, the deterministic replay remediation and verification system 100 may perform rule evaluation based on common weakness enumeration (CWE) following taint propagation. In one or more embodiments, rule evaluation applies deterministic, version-pinned logic to classify detected violations according to defined CWE categories. The deterministic replay remediation and verification system 100 executes rules in a fixed hierarchy that involves syntax analysis, AST evaluation, taint analysis, and compliance classification without altering execution order between runs. Each rule declares a specific CWE identifier, severity level, and remediation template binding, ensuring one-to-one mapping between weakness class and corrective action. Each rule maps to a deterministic template. When a violation is detected, the deterministic replay remediation and verification system 100 selects the appropriate template, substitutes parameters in a predefined order, and generates a patch. During this stage, violations are matched against declarative markup language defined rules that specify structural patterns, taint roles, sink behavior, and classification metadata. Each rule includes a fixed rule ID, CWE identifier, severity label, and a deterministic remediation binding. Evaluation proceeds in a locked execution order: syntax, AST, taint, then compliance classification without reordering or heuristic branching. Because rules are data objects rather than executable scripts, they cannot mutate execution flow dynamically. When a violation condition is satisfied, the deterministic replay remediation and verification system 100 produces a structured RuleEval record containing justification, AST references, and contextual metadata. Severity ranking affects reporting but does not alter remediation behavior or template selection logic. Rules are version-pinned, and replay validation requires the same ruleset version to regenerate identical findings. If multiple conditions are theoretically satisfied, deterministic ordering rules govern selection to prevent output drift. Thus, rule evaluation functions as a reproducible, classification-bound decision the deterministic replay remediation and verification system 100 that maps structural weakness to a defined remediation pathway without inference.

In a further aspect of the disclosure, the deterministic remediation templates may sanitize code or insert validation or escaping wrappers when tainted input reaches sensitive sinks. Sanitization is not performed heuristically but is bound to predefined templates mapped to specific CWE classifications. When a rule detects untrusted input propagating toward operations such as SQL execution, file writes, or command invocation, a sanitization template is selected deterministically. The template inserts guard logic, parameterization, or encoding routines in a fixed lexical order so that output remains byte-identical across replays. Sanitization routines such as escape wrappers or input validation functions are version-pinned and cryptographically validated before use. The deterministic replay remediation and verification system 100 prohibits generative inference or runtime improvisation when constructing sanitization code, ensuring stability over time. Variable substitution during sanitization follows lexicographically sorted binding rules to eliminate ordering drift. If sanitization cannot be applied under deterministic constraints, the system emits a violation-only record rather than guessing at a fix. This strict approach ensures that sanitization remains predictable, auditable, and replay-verifiable within the overall remediation architecture.

In block 230, when a taint vector or structural pattern satisfies a rule's match conditions, the deterministic replay remediation and verification system 100 produces a violation event that records the rule identifier, CWE code, and contextual AST coordinates. One or more static, non-generative, predefined remediation templates are selected and mapped for patching/fixing the received code. Template Selection occurs immediately after a rule fires and is governed by a deterministic binding model defined as CWE→Rule→Template. Each rule declares exactly one remediation template ID, eliminating ambiguity in patch selection. The deterministic replay remediation and verification system 100 resolves the template purely through static lookup; no scoring model, ranking heuristic, or fallback candidate set is consulted. If multiple templates could theoretically apply, lexicographic ordering is enforced and only the first valid template is selected, ensuring reproducible behavior. Template resolution is version-controlled and signature-validated before execution. Because replay must regenerate the identical patch, template selection cannot depend on runtime context, machine characteristics, or timing. If no template is bound to a triggered rule, the system emits a violation-only log event and refrains from patch generation. This fail-closed model prevents speculative remediation and preserves deterministic integrity. Template selection therefore serves as the fixed bridge between violation detection and static patch construction, guaranteeing that the same weakness always yields the same remediation artifact. Template mapping is defined as a structural one-to-one relationship linking each CWE category to a specific rule and then to a single deterministic remediation template. For example, a mapping table may be defined to formalize entries, ensuring that SQL injection always resolves to a parameterized query template. This binding model prevents drift because the system does not "choose" among candidate repairs; it follows a predetermined path. The mapping may expand over time as new CWE categories are added, but its structural form never changes. Each mapping is version-pinned, and historical ledger entries record the ruleset version and template version used at the time of remediation. During replay, the deterministic replay remediation and verification system 100 must use the same mapping tuple to regenerate identical output. If a mapping changes without a version increment, replay will fail and rollback will occur automatically. This design guarantees that identical weaknesses detected years apart under the same version conditions produce identical patches. Template mapping is therefore not advisory metadata but a deterministic enforcement mechanism that anchors remediation output to a reproducible classification pathway.

In block 235, the received code is patched using the one or more selected and mapped templates. In other words, code patches/fixed are deterministically based on rule evaluation and predefined/static remediation templates. In a further aspect of the disclosure, severity scoring does not influence patch variability. Instead, severity scoring serves reporting and compliance purposes. The mapping structure enforces the invariant order involving determining CWE, followed by rule evaluation, template selection, and then deterministic patching thereby eliminating ambiguity in repair selection. If multiple templates could theoretically apply, lexicographic ordering resolves the selection deterministically to prevent output drift.

In block 270, when no remediation template exists for a triggered rule, the deterministic replay remediation and verification system 100 logs a violation-only event and refrains from modifying code, preserving fail-closed behavior. A violation may be identified when untrusted data reaches a sensitive sink such as a database write, filesystem operation, shell invocation, or network transmission. In block 275, when a rule is triggered but no deterministic remediation template is available, the system produces a violation-only log record and does not modify the source code, yet CI/CD merge may proceed because no patch has been generated that requires replay validation. In this scenario, the deterministic replay remediation and verification system 100 detects a weakness through deterministic rule evaluation and records a structured violation event containing the rule identifier, CWE classification, severity level, and contextual AST/taint metadata. However, because no static template is bound to that rule, the deterministic replay remediation and verification system 100 intentionally refrains from generating a remediation patch. Since no patch artifact exists, there is no replay comparison required and therefore no risk of nondeterministic output entering the repository. The ledger is not mutated with a remediation block, preserving lineage integrity while still maintaining an auditable violation trail. The CI/CD merge gate logic from violation ledger merge system 160 distinguishes between "remediation-required" events and "log-only" events. Replay equivalence is mandatory only when code transformation occurs. If the outcome is violation-only, the system logs the event in deterministic JSON format but does not trigger rollback or merge blocking. This design ensures that the merge gate enforces reproducibility strictly for code modifications, not for advisory detections. The rationale is that preventing merge without an applied patch would conflate detection with remediation authority and could stall development unnecessarily. By allowing merge in violation-only cases, the system maintains audit visibility, preserves deterministic behavior, avoids speculative or heuristic fixes, and keeps enforcement focused on replay-verified code changes rather than mere findings.

With reference to FIG. 2B, at block 240, the deterministic replay remediation and verification system 100 may store the processed code (e.g., patched/fixed code) from an executed run to perform a second or additional remediation and verification of the received code. As described above, during the first execution, the deterministic replay remediation and verification system 100 processes code through a fixed deterministic pipeline that includes normalization, AST construction, taint propagation, rule evaluation, and template-based patch generation. When a violation is detected and a remediation template is bound, the system generates a remediation artifact commonly referred to as Patch_$R_1$. This patch is constructed exclusively from static, version-pinned templates and lexicographically ordered substitutions, ensuring that no generative inference or randomness influences output (i.e., processed code). After patch generation, a cryptographic hash (patch_hash) is computed over the resulting patched content. This hash becomes the canonical identity of the remediation and is stored in a structured JSON patch event log that includes the rule identifier, template version, substitutions, and applied status. The deterministic replay remediation and verification system 100 may also compute input (received code) and output (processed code) digests (e.g., SHA256 of source_before and source_after), forming a reproducible signature of the transformation. In block 240, the patch is provisional and not yet authoritative, meaning it has not been committed to the ledger. The replay signature derived from Patch_$R_1$ serves as the reference anchor for subsequent verification. Importantly, although the first execution produces a patch artifact and associated metadata, commit authority is explicitly withheld until replay validation succeeds. Thus, the first run's output is stored as a deterministic, hash-bound remediation candidate awaiting verification rather than as a finalized state change.

With reference again to FIG. 2B, at block 245, the deterministic replay remediation and verification system 100 may perform an independent replay validation pass returning to block 205 or block 210 to process the received code and attempt to reproduce the same remediation under identical rule and template conditions. The deterministic replay remediation and verification system 100 reprocesses the original input using the same ruleset version and template version to generate Patch_$R_2$. No external entropy, network access, model inference, or runtime variability is permitted during this replay phase. In certain implementations, in block 263, additional executions may be performed by the deterministic replay remediation and verification system 100 to test, for example, a likelihood of transmission error or data corruption of an accepted byte-level matching code. If a patching variant or alternative template exists that produces more stable or resilient patch code, the deterministic replay remediation and verification system 100 may run a third and fourth iteration using the variant predefined, static remediation template to obtain more stable/resilient processed/patched code. In block 265, the deterministic replay remediation and verification system 100 performs byte-level comparison. Once Patch_$R_2$ is generated, the deterministic replay remediation and verification system 100 computes its hash and performs a byte-level comparison against the stored patch hash from the first execution (Patch_$R_1$). In block 250, processed code is committed and a corresponding ledger entry is created by deterministic replay remediation and verification system 100. The replay is considered successful only if Patch_$R_1$ and Patch_$R_2$ are bit-for-bit identical and their hashes match exactly. In block 255, when equivalence is confirmed, the deterministic replay remediation and verification system 100 proceeds to ledger commit, writing an append-only block containing the patch hash, prior hash linkage, ruleset version, template version, and replay verification signature. This ledger entry cryptographically anchors the remediation in immutable history.

With reference again to FIG. 2B, at block 255, the deterministic replay remediation and verification system 100 may perform continuous integration (CI) and/or continuous delivery (CD) (CI/CD). The CI/CD merge or deployment gating is enforced only after replay equivalence and ledger verification have been satisfied. In this deterministic replay remediation and verification system 100, a generated patch is not automatically trusted or merged simply because it fixes a vulnerability. As described herein, a generated patch (or processed code) must first survive a deterministic replay check that regenerates the same remediation under identical rule and template conditions. The first execution produces a patch and associated hash, and a second independent replay run must produce a byte-identical result. The system then performs a hash comparison, and only when the replay hash matches the original patch hash is the change eligible for commit. At that point, the remediation is written to the append-only, hash-linked ledger, anchoring the fix in a cryptographically verifiable history. The CI/CD pipeline is configured so that merge is contingent on both replay match and successful ledger commit, meaning the gate enforces reproducibility as a hard boundary condition. If replay fails for any reason, whether due to drift, template mismatch, environment inconsistency, or tampering, the deterministic replay remediation and verification system 100 automatically triggers rollback to the last known good state and blocks the merge. There is no override path or discretionary approval that can bypass replay mismatch, reinforcing a fail-closed model. This approach ensures that only reproducible, deterministic, and audit-verifiable patches reach protected branches or production environments. The purpose of this merge gate is to eliminate nondeterministic remediation, prevent drift over time, guarantee long-term replay integrity, and ensure compliance-grade traceability where reproducibility is mandatory rather than advisory.

With reference again to FIG. 2B, at block 265, when the byte-level comparison does not must produce a byte-identical result, the deterministic replay remediation and verification system 100 may immediately trigger a rollback to the last-known-good ledger state (e.g., the last known good version of the received code) in block 280, and blocks CI/CD merge in block 285. No override path exists for mismatch conditions. Replay identity is the authorization barrier. Therefore, the second execution is not merely a verification step but a deterministic control gate that determines whether remediation is granted commit authority or rejected entirely.

Method for Implementing Powder Transfer

FIG. 3 illustrates an example flow chart showing a method of enforcing deterministic replay remediation and verification of received code to provide reproducible code fixes, auditable changes, long-term traceability, and prevent uncertain or unverifiable changes and accidental or unstable merges, in accordance with one or more embodiments of the present disclosure. These exemplary methods are provided by way of example, as there are a variety of ways to carry out these methods. Each block shown in FIG. 3 represents one or more processes, methods, or subroutines, carried out in the exemplary method. FIGS. 1, 2A-2B, and 4 show example embodiments of carrying out the method of FIG. 3 for enforcing deterministic replay remediation and verification of received code to provide reproducible code fixes, auditable changes, long-term traceability, and prevent uncertain or unverifiable changes and accidental or unstable merges. Each block shown in FIG. 3 represents one or more processes, methods, or subroutines, carried out in the exemplary method. The exemplary method may begin at block 305. Method 300 may be used independently or in combination with other methods or process for enforcing deterministic replay remediation and verification of received code to provide reproducible code fixes, auditable changes, long-term traceability, and prevent uncertain or unverifiable changes and accidental or unstable merges. For explanatory purposes, the example process 300 is described herein with reference to the powder transfer system of FIGS. 1, 2A-2B, and 4. Further for explanatory purposes, the blocks of the example process 300 are described herein as occurring in serial, or linearly. However, multiple blocks of the example process 300 may occur in parallel. In addition, the blocks of the example process 300 may be performed in a different order than the order shown and/or one or more of the blocks of the example process 300 may not be performed. Further, any or all blocks of example process 300 may further be combined and done in parallel, in order, or out of order.

In FIG. 3, the exemplary method 300 of a deterministic replay remediation and verification system for enforcing deterministic replay remediation and verification of received code to provide reproducible code fixes, auditable changes, long-term traceability, and prevent uncertain or unverifiable changes and accidental or unstable merges, is shown. Method 300 begins at block 305. In block 305, the method includes receiving computer processable code comprising visual or textual information or building block. In block 310, the method includes selecting, upon execution of at least one run, a remediation template based on at least a portion of the received code, the remediation template comprising at least one of code remediation data and remediation instructions. In block 315, the method includes applying, in the executed run, the one or more code remediation data or remediation instructions to the received code. In block 320, the method includes storing, after the executed run, the received code applied with the one or more code remediation data or remediation instructions from the remediation template as a processed code. In block 325, the method includes executing a second run of the at least one run. In block 330, the method includes comparing the processed code from an executed first run with the processed code from the executed second run. In block 335, the method includes verifying whether the processed code from the first run matches the processed code from the second run at a byte level.

It is noted that, although specific examples of processing steps for a deterministic replay remediation system have been illustrated and discussed, the order of the processing steps could be changed, if desired, and/or additional processing steps could be added.

In the following, further features, characteristics, and advantages of the instant application will be described by means of items:

Item 1. A method for deterministic replay remediation and verification of code, comprising: receiving computer processable code comprising visual or textual information or building block; executing at least one run, each executed run comprising: selecting a remediation template based on at least a portion of the received code, the remediation template comprising at least one of code remediation data and remediation instructions, applying the one or more code remediation data or remediation instructions to the received code, and storing the received code applied with the one or more code remediation data or remediation instructions from the remediation template as a processed code; executing a second run of the at least one run; comparing the processed code from an executed first run with the processed code from the executed second run; and verifying whether the processed code from the first run matches the processed code from the second run at a byte level.

Item 2. The method of clause 1, further comprising replacing the received code with the first run processed code, when the second run processed code matches byte-for-byte with the first run processed code.

Item 3. The method of clause 1, further comprising approving a commit, promotion, patch, merge, deployment, or ledger update using the first run processed code when the second run processed code matches byte-for-byte with the first run processed code.

Item 4. The method of clause 3, further comprising creating a cryptographic hash associated with the first run processed code and recording an entry on a ledger, wherein the ledger entry comprises at least one of a rule hash, a template hash, a generated patch hash, and a replay verification signature associated with the processed code in each of the first and second runs.

Item 5. The method of clause 1, further comprising rolling back the first run processed code to the received code when the processed code from the first run and the second run do not match byte-for-byte.

Item 6. The method of clause 5, wherein the rollback restores a previous known-good state of the first run processed code and blocks a commit or deployment of the first run processed code from progressing.

Item 7. The method of clause 1, further comprising comparing the remediation template in the second run with the remediation template in the first run.

Item 8. The method of clause 7, further comprising storing a violation notification and preventing modification of the received code when the remediation template in the second run does not match the remediation template in the first run.

Item 9. The method of clause 1, further comprising storing a violation notification and preventing modification of the received code when the remediation template is not found on the first run or subsequent runs.

Item 10. The method of clause 1, wherein the remediation template selected in each run of the at least one run is static, rule based, and non-generative, and wherein the remediation template includes data associated with at least one of code analysis and rule evaluation.

Item 11. The method of clause 1, wherein the remediation template selected in the second run is the same as the template selected in the first run.

Item 12. The method of clause 1, wherein the remediation template is stored offline, and application of the one or more code remediation data or remediation instructions is performed offline.

Item 13. The method of clause 1, wherein the remediation template contains a class mapping, and wherein the remediation template is version-pinned, signature-verified, and remains unchanged during each run to assure future compliance.

Item 14. The method of clause 1, wherein the remediation template comprises of rule evaluation data that includes two or more of the following: syntax analysis, abstract syntax tree generation, taint propagation, compliance scoring, and template assignment.

Item 15. The method of clause 2, further comprising enforcing deterministic replay remediation and verification through execution of two runs, selection of identical remediation templates in each of the two executed runs, byte-for-byte matching, and rolling back the first run processed code to the received code when the processed code from the first run and the second run do not match byte-for-byte.

Item 16. A non-transitory computer-readable medium that includes stored thereon computer-executable instructions that when executed by at least a processor of a computer cause the computer to: receive computer processable code comprising visual or textual information or building block; execute at least one run, each executed run comprising: selecting a remediation template based on at least a portion of the received code, the remediation template comprising at least one of code remediation data and remediation instructions, applying the one or more code remediation data or remediation instructions to the received code, and storing the received code applied with the one or more code remediation data or remediation instructions from the remediation template as a processed code; execute a second run of the at least one run; compare the processed code from the first run with the processed code from the second run; and verify whether the processed code from the first run matches the processed code from the second run at a byte level.

Item 17. The non-transitory computer-readable medium of clause 16, further comprising instructions that when executed by at least the processor cause the processor to: replace the received code with the first run processed code, when the second run processed code matches byte-for-byte with the first run processed code.

Item 18. The non-transitory computer-readable medium of clause 16, further comprising instructions that when executed by at least the processor cause the processor to: approve a commit, promotion, patch, merge, deployment, or ledger update using the first run processed code when the second run processed code matches byte-for-byte with the first run processed code.

Item 19. The non-transitory computer-readable medium of clause 18, further comprising instructions that when executed by at least the processor cause the processor to: create a cryptographic hash associated with the first run processed code and record an entry on a ledger, wherein the ledger entry comprises at least one of a rule hash, a template hash, a generated patch hash, and a replay verification signature associated with the processed code in each of the first and second runs.

Item 20. The non-transitory computer-readable medium of clause 16, further comprising instructions that when executed by at least the processor cause the processor to: roll back the first run processed code to the received code when the processed code from the first run and the second run do not match byte-for-byte.

Item 21. The non-transitory computer-readable medium of clause 20, further comprising instructions that when executed by at least the processor cause the processor to: restore the previous known-good state of the first run processed code on roll back and block a commit or deployment of the first run processed code from progressing.

Item 22. The non-transitory computer-readable medium of clause 16, further comprising instructions that when executed by at least the processor cause the processor to: compare the remediation template in the second run with the remediation template in the first run.

Item 23. The non-transitory computer-readable medium of clause 22, further comprising instructions that when executed by at least the processor cause the processor to: store a violation notification and prevent modification of the received code when the remediation template in the second run does not match the remediation template in the first run.

Item 24. The non-transitory computer-readable medium of clause 16, further comprising instructions that when executed by at least the processor cause the processor to: store a violation notification and prevent modification of the received code when the remediation template is not found on the first run or subsequent runs.

Item 25. The non-transitory computer-readable medium of clause 16, further comprising instructions that when executed by at least the processor cause the processor to: select the remediation template for use in at least one of code analysis and rule evaluation, wherein the remediation template selected in each run is static, rule based, and non-generative.

Item 26. The non-transitory computer-readable medium of clause 16, further comprising instructions that when executed by at least the processor cause the processor to: select the remediation template in the second run that is the same as the remediation template selected in the first run.

Item 27. The non-transitory computer-readable medium of clause 16, further comprising instructions that when executed by at least the processor cause the processor to: select the remediation template from an offline location and perform application of the one or more code remediation data or remediation instructions offline.

Item 28. The non-transitory computer-readable medium of clause 16, further comprising instructions that when executed by at least the processor cause the processor to: select the remediation template, wherein the remediation template contains a class mapping, and wherein the remediation template is version-pinned, signature-verified, and remains unchanged during each run to assure future compliance.

Item 29. The non-transitory computer-readable medium of clause 16, further comprising instructions that when executed by at least the processor cause the processor to: select the remediation template, wherein the remediation template comprises of rule evaluation data that includes syntax analysis, abstract syntax tree generation, taint propagation, compliance scoring, and template assignment.

Item 30. A computing system comprising: a processor; and memory in communication with the processor and storing instructions that, when executed by the processor, cause the computing system to: receive computer processable code comprising visual or textual information or building block; execute at least one run, each executed run comprising: selecting a remediation template based on at least a portion of the received code, the remediation template comprising at least one of code remediation data and remediation instructions, applying the one or more code remediation data or remediation instructions to the received code, and storing the received code applied with the one or more code remediation data or remediation instructions from the remediation template as a processed code; execute a second run of the at least one run; compare the processed code from the first run with the processed code from the second run; and verify whether the processed code from the first run matches the processed code from the second run at a byte level.

Definitions

A "client device", "remote client device", "external computing device", and "computing device" as used herein includes, but is not limited to, any computing device capable of running, view, or accessing, the deterministic replay remediation and verification system, including software, code, functions, algorithms, or instructions associated therein, as well as access a facility/building database as needed or as authorized.

Computing Device Embodiment

FIG. 4 illustrates an example computing device that is configured and/or programmed as a special purpose computing device with one or more of the example systems and methods described herein, and/or equivalents. The example computing device may be a computer 400 that includes at least one hardware processor 402, a memory 404, and input/output ports 410 operably connected by a bus 408. In one example, the computer 400 may include deterministic replay remediation and verification system logic 430 configured to enforce deterministic replay remediation and verification using static, predefined, non-generative templates to provide reproducible fixes, auditable changes, long-term traceability, and preventing uncertain or unverifiable changes and accidental or unstable merges as the deterministic replay remediation and verification system 100 and associated figures. The deterministic replay remediation and verification system logic 430 enforces deterministic replay remediation and verification of received code through execution of two runs of code remediation that involves selection of identical, static, non-generative remediation template(s) in each of the two executed runs, processing the received code in each run using the remediation template(s), performing byte-for-byte matching of each processed code in each run, and merging byte-for-byte matching code or rolling back to the last known good version of the received code when the processed code from the first run and the second run do not match byte-for-byte as described herein. In different examples, the logic 430 may be implemented in hardware, a non-transitory computer-readable medium 437 with stored instructions, firmware, and/or combinations thereof. While the logic 430 is illustrated as a hardware component attached to the bus 408, it is to be appreciated that in other embodiments, the logic 430 could be implemented in the processor 402, stored in memory 404, or stored in disk 406.

In one embodiment, logic 430 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on. The means may be implemented, for example, as an ASIC programmed to facilitate serial or parallel execution of deterministic replay remediation and verification of received code through execution of two runs of code remediation that involves selection of identical, static, non-generative remediation template(s) in each of the two executed runs, processing the received code in each run using the remediation template(s), performing byte-for-byte matching of each processed code in each run, and merging byte-for-byte matching code or rolling back to the last known good version of the received code when the processed code from the first run and the second run do not match byte-for-byte. The means may also be implemented as stored computer executable instructions that are presented to computer 400 as data 416 that are temporarily stored in memory 404 and then executed by processor 402.

Logic 430 may also provide means (e.g., hardware, non-transitory computer-readable medium that stores executable instructions, firmware) for performing one or more of the disclosed functions and/or combinations of the functions.

Generally describing an example configuration of the computer 400, the processor 402 may be a variety of various processors including dual microprocessor and other multi-processor architectures. A memory 404 may include volatile memory and/or non-volatile memory. Non-volatile memory may include, for example, ROM, PROM, and so on. Volatile memory may include, for example, RAM, SRAM, DRAM, and so on.

A storage disk 406 may be operably connected to the computer 400 via, for example, an input/output (I/O) interface (e.g., card, device) 418 and an input/output port 410 that are controlled by at least an input/output (I/O) controller 440. The disk 406 may be, for example, a magnetic disk drive, a solid-state disk drive, a floppy disk drive, a tape drive, a Zip drive, a flash memory card, a memory stick, and so on. Furthermore, the disk 406 may be a CD-ROM drive, a CD-R drive, a CD-RW drive, a DVD ROM, and so on. The memory 404 can store a process 414 and/or a data 416, for example. The disk 406 and/or the memory 404 can store an operating system that controls and allocates resources of the computer 400.

The computer 400 may interact with, control, and/or be controlled by input/output (I/O) devices via the input/output (I/O) controller 440, the I/O interfaces 418, and the input/output ports 410. Input/output devices may include, for example, one or more displays 470, printers 472 (such as inkjet, laser, or 3D printers), audio output devices 474 (such as speakers or headphones), text input devices 480 (such as keyboards), cursor control devices 482 for pointing and selection inputs (such as mice, trackballs, touch screens, joysticks, pointing sticks, electronic styluses, electronic pen tablets), audio input devices 484 (such as microphones or external audio players), video input devices 486 (such as video and still cameras, or external video players), image scanners 488, video cards (not shown), disks 406, network devices 420, and so on. The input/output ports 410 may include, for example, serial ports, parallel ports, and USB ports.

The computer 400 can operate in a network environment and thus may be connected to the network devices 420 via the I/O interfaces 418, and/or the I/O ports 410. Through the network devices 420, the computer 400 may interact with a network 460. Through the network, the computer 400 may be logically connected to remote computers 465. Networks with which the computer 400 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The term "adjacent", "within a proximity", "a vicinity", "within a vicinity", "within a predetermined distance", "predetermined width", "predetermined height", "predetermined length" and the like may be defined between about 0.01 centimeter and about 0.5 meters. The term "coupled" is defined as connected, whether directly or indirectly through intervening components, and is not necessarily limited to physical connections. The connection may be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder but may have one or more deviations from a true cylinder. The term "comprising," when utilized, means "including, but not necessarily limited to"; it specifically indicates open-ended inclusion or membership in the so-described combination, group, series, and the like.

The term "a predefined" or "a predetermined" when referring to length, width, height, or distances may be defined as between about 0.01 centimeter and about 0.5 meters.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the present disclosure, the disclosure, the present disclosure, other variations thereof and alike are for convenience and do not imply that a disclosure relating to such phrase(s) is essential to the present disclosure or that such disclosure applies to all configurations of the present disclosure. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may. The embodiments shown and described above are only examples. Many details are often found in the art such as other features of an image device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A method for deterministic replay remediation and verification of code, comprising:
   receiving computer processable code comprising visual or textual information or building block;
   executing a first run and a second run, each of the executed first run and second run comprising:
      selecting a remediation template based on at least a portion of the received code, the remediation template comprising at least one of code remediation data and remediation instructions,
      applying at least one of the code remediation data and remediation instructions to the received code to form a processed code;
   determining whether the processed code from the executed first run matches the processed code from the executed second run at a byte level;
   processing a request for approving at least one of commit, promotion, patch, merge, deployment, and ledger update using the processed code of the first run when the second run processed code matches byte-for-byte with the first run processed code; and
   creating a cryptographic hash associated with the first run processed code and recording an entry on a ledger, wherein the ledger entry comprises at least one of a rule hash, a template hash, a generated patch hash, and a replay verification signature associated with the processed code in each of the first and second runs.

2. The method of claim 1, further comprising replacing the received code with the first run processed code, when the second run processed code matches byte-for-byte with the first run processed code.

3. The method of claim 1, further comprising applying at least one of the commit, promotion, patch, merge, deployment, and ledger update using the processed code of the first run when the second run processed code matches byte-for-byte with the first run processed code.

4. The method of claim 1, further comprising receiving a request to enforce deterministic remediation and code verification for the received code.

5. The method of claim 1, further comprising rolling back the first run processed code to the received code when the processed code from the first run and the second run do not match byte-for-byte.

6. The method of claim 5, wherein the rollback restores a previous known-good state of the first run processed code and blocks a commit or deployment of the first run processed code from progressing towards approval.

7. The method of claim 1, further comprising comparing the remediation template in the second run with the remediation template in the first run.

8. The method of claim 7, further comprising storing a violation notification and preventing modification of the received code when the remediation template in the second run does not match the remediation template in the first run.

9. The method of claim 1, further comprising storing a violation notification and preventing modification of the received code when the remediation template is not found on either of the first run or the second run.

10. The method of claim 1, wherein the remediation template selected in each of the first and second runs is static, rule based, and non-generative, and wherein the remediation template includes data associated with at least one of code analysis and rule evaluation.

11. The method of claim 1, wherein the remediation template selected in the second run is the same as the template selected in the first run.

12. The method of claim 1, wherein the remediation template is stored offline, and application of at least of the code remediation data and remediation instructions is performed offline.

13. The method of claim 1, wherein the remediation template contains a class mapping, and wherein the remediation template is version-pinned, signature-verified, and remains unchanged during each of the first and second runs to ensure future compliance.

14. The method of claim 1, wherein the remediation template comprises of rule evaluation data that includes one or more of the following: syntax analysis, abstract syntax tree generation, taint propagation, compliance scoring, and template assignment.

15. The method of claim 1, further comprising enforcing deterministic replay remediation and verification through execution of the first and second runs, selection of identical remediation templates in each of the executed first and second runs, byte-for-byte matching, and rolling back the first run processed code to the received code when the processed code from the first run and the second run do not match byte-for-byte.

16. A non-transitory computer-readable medium that includes stored thereon computer-executable instructions that when executed by at least a processor of a computer cause the computer to:

receive computer processable code comprising visual or textual information or building block;

execute a first run and a second run, each of the executed first run and second run comprising:

selecting a remediation template based on at least a portion of the received code, the remediation template comprising at least one of code remediation data and remediation instructions, applying at least one of the code remediation data and remediation instructions to the received code to form a processed code;

determine whether the processed code from the executed first run matches the processed code from the executed second run at a byte level;

process a request for approving at least one of commit, promotion, patch, merge, deployment, and ledger update using the processed code of the first run when the second run processed code matches byte-for-byte with the first run processed code; and create a cryptographic hash associated with the first run processed code and recording an entry on a ledger, wherein the ledger entry comprises at least one of a rule hash, a template hash, a generated patch hash, and a replay verification signature associated with the processed code in each of the first and second runs.

17. A computing system comprising:

a processor; and memory in communication with the processor and storing instructions that, when executed by the processor, cause the computing system to:

receive computer processable code comprising visual or textual information or building block;

execute a first run and a second run, each of the executed first run and second run comprising:

selecting a remediation template based on at least a portion of the received code, the remediation template comprising at least one of code remediation data and remediation instructions, applying at least one of the code remediation data and remediation instructions to the received code to form a processed code;

determine whether the processed code from the executed first run matches the processed code from the executed second run at a byte level;

process a request for approving at least one of commit, promotion, patch, merge, deployment, and ledger update using the processed code of the first run when the second run processed code matches byte-for-byte with the first run processed code; and create a cryptographic hash associated with the first run processed code and recording an entry on a ledger, wherein the ledger entry comprises at least one of a rule hash, a template hash, a generated patch hash, and a replay verification signature associated with the processed code in each of the first and second runs.

18. The computing system of claim 17, further comprising causing the computing system to: replace the received code with the first run processed code, when the second run processed code matches byte-for-byte with the first run processed code.

19. The computing system of claim 17, further comprising causing the computing system to: apply at least one of the commit, promotion, patch, merge, deployment, and ledger update using the processed code of the first run when the second run processed code matches byte-for-byte with the first run processed code.

20. The computing system of claim 17, further comprising causing the computing system to: receive a request to enforce deterministic remediation and code verification for the received code.

\* \* \* \* \*